(12) United States Patent
Sharma

(10) Patent No.: US 8,687,839 B2
(45) Date of Patent: Apr. 1, 2014

(54) ROBUST SIGNATURES DERIVED FROM LOCAL NONLINEAR FILTERS

(75) Inventor: Ravi K. Sharma, Hillsboro, OR (US)

(73) Assignee: Digimarc Corporation, Beaverton, OR (US)

( * ) Notice: Subject to any disclaimer, the term of this patent is extended or adjusted under 35 U.S.C. 154(b) by 716 days.

(21) Appl. No.: 12/784,736

(22) Filed: May 21, 2010

(65) Prior Publication Data

US 2010/0325117 A1    Dec. 23, 2010

Related U.S. Application Data

(60) Provisional application No. 61/180,354, filed on May 21, 2009.

(51) Int. Cl.
*G06K 9/00* (2006.01)
*G06K 9/46* (2006.01)
*G06K 9/68* (2006.01)

(52) U.S. Cl.
USPC .......................... 382/100; 382/190; 382/218

(58) Field of Classification Search
None
See application file for complete search history.

(56) References Cited

U.S. PATENT DOCUMENTS

| | | | |
|---|---|---|---|
| 4,739,398 A | 4/1988 | Thomas et al. | |
| 5,019,899 A | 5/1991 | Boles | |
| 6,483,927 B2 | 11/2002 | Brunk et al. | |
| 6,724,914 B2 | 4/2004 | Brundage et al. | |
| 7,076,082 B2 | 7/2006 | Sharma | |
| 7,130,467 B1 * | 10/2006 | Bronder et al. | 382/218 |
| 8,150,096 B2 | 4/2012 | Alattar | |
| 2005/0065734 A1 * | 3/2005 | Declerck et al. | 702/19 |
| 2006/0031684 A1 | 2/2006 | Sharma et al. | |

OTHER PUBLICATIONS

Swaminathan, A., Mao, Y. and Wu, M., "Image hashing resilient to geometric and filtering operations," IEEE Workshop on Multimedia Signal Processing (MMSP), pp. 355-358, Sep. 2004.*
Seo, J. S., Haitsma, J., Kalker, T. and Yoo, C. D., "Affine transform resilient image fingerprinting," Proc. Int. Conf. Acoust., Speech and Signal Processing (ICASSP), vol. 3, pp. 61-64, Apr. 2003.*
Bhat, D. N. and Nayar, S. K., "Ordinal measures for image correspondence," IEEE Trans Pattern Ana. Mach. Intell., vol. 20, No. 4, pp. 415-423, Apr. 1998.
Mohan, R., "Video sequence matching," Proc. Int. Conf. Acoust., Speech and Signal Processing (ICASSP), vol. 6, pp. 3697-3700, Jan. 1998.

(Continued)

*Primary Examiner* — Randolph I Chu
(74) *Attorney, Agent, or Firm* — Digimarc Corporation

(57) ABSTRACT

Content signal recognition is based on a multi-axis filtering of the content signal. The signatures are calculated, formed into data structures and organized in a database for quick searching and matching operations used in content recognition. For content recognition, signals are sampled and transformed into signatures using the multi axis filter. The database is searched to recognize the signals as part of a content item in the database. Using the content identification, content metadata is retrieved and provided for a variety of applications. In one application, the metadata is provided in response to a content identification request.

25 Claims, 13 Drawing Sheets

(56) References Cited

OTHER PUBLICATIONS

Oostveen, J., Kalker, T. and Haitsma, J., "Feature extraction and a database strategy for video fingerprinting," Proc. 5th Int. Conf. Recent Advance in Visual Information Systems, pp. 117-128, 2002.

Kim, C. and Vasudev B., "Spatiotemporal sequence matching for efficient video copy detection," IEEE Trans. Circuits Syst. Video Technol., vol. 15, No. 1, pp. 127-132, Jan. 2005.

Lu, J., "Video fingerprinting for copy identification: from research to industry applications", Proceedings of SPIE, Media Forensics and Security, vol. 7254, Feb. 2009.

* cited by examiner

Image divided into 64 subblocks

Mean luminance of subblocks

| 143 | 167 | 170 | 169 | 179 | 177 | 178 | 154 |
| 175 | 163 | 180 | 175 | 191 | 178 | 175 | 126 |
| 224 | 218 | 185 | 156 | 156 | 157 | 135 | 111 |
| 236 | 218 | 134 | 122 | 124 | 143 | 110 | 100 |
| 183 | 112 | 118 | 105 | 114 | 103 | 102 | 105 |
| 96 | 93 | 97 | 88 | 79 | 74 | 69 | 72 |
| 91 | 100 | 103 | 105 | 111 | 111 | 114 | 107 |
| 104 | 122 | 110 | 133 | 110 | 133 | 113 | 136 |

Ordinal rank of subblock luminance

| 39 | 46 | 48 | 47 | 55 | 52 | 54 | 41 |
| 49 | 45 | 56 | 50 | 59 | 53 | 51 | 33 |
| 62 | 60 | 58 | 42 | 43 | 44 | 37 | 24 |
| 63 | 61 | 36 | 31 | 32 | 40 | 21 | 10 |
| 57 | 25 | 29 | 15 | 27 | 13 | 11 | 17 |
| 7 | 6 | 8 | 4 | 3 | 2 | 0 | 1 |
| 5 | 9 | 12 | 16 | 22 | 23 | 28 | 18 |
| 14 | 30 | 19 | 34 | 20 | 35 | 26 | 38 |

Octaxis signature of subblock mean luminances

| -3 | -1 | 1 | -5 | 3 | -3 | 4 | -1 |
| 1 | -6 | 4 | 0 | 8 | 3 | 2 | -3 |
| 3 | 3 | 4 | -1 | -1 | 2 | 0 | -1 |
| 5 | 3 | 0 | -2 | 0 | 4 | 0 | -5 |
| 1 | -2 | 2 | -2 | 2 | 0 | 0 | 3 |
| -1 | -6 | -4 | -6 | -6 | -6 | -8 | -3 |
| -5 | 0 | 0 | 0 | 3 | 1 | 4 | -1 |
| 1 | 5 | 1 | 5 | -3 | 5 | -1 | 3 |

Horizontally cropped image

Subblock mean lum, horizontally cropped image

| 97  | 167 | 170 | 169 | 179 | 177 | 178 | 110 |
|-----|-----|-----|-----|-----|-----|-----|-----|
| 107 | 163 | 180 | 175 | 191 | 178 | 175 | 90  |
| 139 | 218 | 185 | 156 | 156 | 157 | 135 | 75  |
| 143 | 218 | 134 | 122 | 124 | 143 | 110 | 68  |
| 109 | 112 | 118 | 105 | 114 | 103 | 102 | 65  |
| 58  | 93  | 97  | 88  | 79  | 74  | 69  | 48  |
| 58  | 100 | 103 | 105 | 111 | 111 | 114 | 74  |
| 62  | 122 | 110 | 133 | 110 | 133 | 113 | 91  |

Ordinal rank of subblock lums, horizontally cropped image

| 15 | 50 | 52 | 51 | 58 | 55 | 57 | 28 |
|----|----|----|----|----|----|----|----|
| 23 | 49 | 59 | 53 | 61 | 56 | 54 | 12 |
| 43 | 62 | 60 | 46 | 47 | 48 | 42 | 9  |
| 44 | 63 | 41 | 37 | 38 | 45 | 27 | 5  |
| 24 | 31 | 35 | 21 | 33 | 20 | 18 | 4  |
| 1  | 14 | 16 | 11 | 10 | 7  | 6  | 0  |
| 2  | 17 | 19 | 22 | 29 | 30 | 34 | 8  |
| 3  | 36 | 25 | 39 | 26 | 40 | 32 | 13 |

Octaxis sig of subblock lums, horizontally cropped image

| -3 | 1  | 1  | -5 | 3  | -3 | 4  | -1 |
|----|----|----|----|----|----|----|----|
| -3 | -2 | 4  | 0  | 8  | 3  | 2  | -3 |
| -3 | 7  | 4  | -1 | -1 | 2  | 0  | -3 |
| 1  | 7  | 0  | -2 | 0  | 4  | 2  | -3 |
| -1 | 0  | 2  | -2 | 2  | 0  | 2  | -3 |
| -4 | -4 | -4 | -6 | -6 | -6 | -4 | -5 |
| -4 | 2  | 0  | 0  | 3  | 1  | 6  | -1 |
| -1 | 5  | 1  | 5  | -3 | 5  | 1  | -1 |

Differences for Ordinal sigs (horiz crop)

| 24 | -4 | -4 | -4 | -3 | -3 | -3 | 13 |
|---|---|---|---|---|---|---|---|
| 26 | -4 | -3 | -3 | -2 | -3 | -3 | 21 |
| 19 | -2 | -2 | -4 | -4 | -4 | -5 | 15 |
| 19 | -2 | -5 | -6 | -6 | -5 | -6 | 5 |
| 33 | -6 | -6 | -6 | -6 | -7 | -7 | 13 |
| 6 | -8 | -8 | -7 | -7 | -5 | -6 | 1 |
| 3 | -8 | -7 | -6 | -7 | -7 | -6 | 10 |
| 11 | -6 | -6 | -5 | -6 | -5 | -6 | 25 |

Differences for Octaxis sigs (horiz crop)

| 0 | -2 | 0 | 0 | 0 | 0 | 0 | 0 |
|---|---|---|---|---|---|---|---|
| 4 | -4 | 0 | 0 | 0 | 0 | 0 | 0 |
| 6 | -4 | 0 | 0 | 0 | 0 | 0 | 2 |
| 4 | -4 | 0 | 0 | 0 | 0 | -2 | -2 |
| 2 | -2 | 0 | 0 | 0 | 0 | -2 | 6 |
| 3 | -2 | 0 | 0 | 0 | 0 | -4 | 2 |
| -1 | -2 | 0 | 0 | 0 | 0 | -2 | 0 |
| 2 | 0 | 0 | 0 | 0 | 0 | -2 | 4 |

Logo simulation

Differences for Ordinal sigs (logo)

| 0  | 0  | 0  | 0  | 0  | 0  | 0  | 0  |
|----|----|----|----|----|----|----|----|
| 0  | 0  | 0  | 0  | 0  | 0  | 0  | -1 |
| 0  | 0  | 0  | 0  | 0  | 0  | -1 | -3 |
| 0  | 0  | -1 | -1 | -1 | 0  | -3 | -1 |
| 0  | -3 | -1 | -4 | -2 | -2 | -2 | -4 |
| -1 | -1 | -1 | -1 | 0  | 0  | 0  | 0  |
| -1 | -1 | -2 | -4 | -3 | -3 | 12 | 14 |
| -4 | -1 | -3 | -1 | -3 | -1 | 14 | 21 |

Differences for Octaxis sigs (logo)

| 0 | 0 | 0 | 0 | 0 | 0  | 0 | 0 |
|---|---|---|---|---|----|---|---|
| 0 | 0 | 0 | 0 | 0 | 0  | 0 | 0 |
| 0 | 0 | 0 | 0 | 0 | 0  | 0 | 0 |
| 0 | 0 | 0 | 0 | 0 | 0  | 0 | 0 |
| 0 | 0 | 0 | 0 | 0 | 0  | 0 | 0 |
| 0 | 0 | 0 | 0 | 0 | 0  | 0 | 0 |
| 0 | 0 | 0 | 0 | 0 | -4 | 1 | 0 |
| 0 | 0 | 0 | 0 | 0 | 0  | 2 | 1 |

2x2 subblocks

Multiaxis signature

| 3  | 1  |
|----|----|
| -1 | -3 |

ROBUST SIGNATURES DERIVED FROM LOCAL NONLINEAR FILTERS

RELATED APPLICATION DATA

This application claims benefit of U.S. Provisional Application 61/180,354, filed May 21, 2009.

TECHNICAL FIELD

The invention relates to signal processing generally, and multimedia signal processing more specifically, including content signal identification, recognition, classification and database searching and retrieval based on content signal attributes.

BACKGROUND AND SUMMARY

Video fingerprinting techniques are based on deriving a fingerprint or characteristic signature from the underlying video signal. Signatures derived from spatial, temporal and spatiotemporal domains are among the most widely used techniques. Spatial signatures characterize one frame of the video sequence, temporal signatures characterize the video signal over time, whereas spatiotemporal signatures characterize a combination of spatial and temporal information. Approaches for characterizing the video signal include ordinal ranking of the subblock mean luminances. See, e.g., Bhat, D. N. and Nayar, S. K., "Ordinal measures for image correspondence," IEEE Trans. Pattern Ana. Mach. Intell., vol. 20, no. 4, pp. 415-423, April 1998. Mohan, R., "Video sequence matching," Proc. Int. Conf. Acoust., Speech and Signal Processing (ICASSP), vol. 6, pp. 3697-3700, January 1998. Another approach includes differential signatures that denote differences (binarized) between mean luminances of neighboring subblocks. Oostveen, J., Kalker, T. and Haitsma, J., "Feature extraction and a database strategy for video fingerprinting," Proc. 5th Int. Conf. Recent Advance in Visual Information Systems, pp. 117-128, 2002. The ordinal measures and differences can be computed either spatially, temporally or spatiotemporally. The video frame is usually divided into subblocks as shown in FIG. 1A, with their mean luminances shown in FIG. 1B. The ordinal ranking of subblock luminances is shown in FIG. 1C. Ordinal measures are robust against global changes (such as change in brightness, contrast) and against common operations such as compression. Kim, C. and Vasudev B., "Spatiotemporal sequence matching for efficient video copy detection," IEEE Trans. Circuits Syst. Video Technol., vol. 15, no. 1, pp. 127-132, January 2005. Lu, J., "Video fingerprinting for copy identification: from research to industry applications", Proceedings of SPIE, Media Forensics and Security, Vol. 7254, February 2009.

Ordinal signatures are susceptible to any change in the image that alters the global ranking of the subblock mean luminances. Examples include horizontal or vertical cropping, as well as local luminance alterations such as insertion of a logo or subtitles. In addition, both ordinal signatures and differential signatures suffer from sensitivity to geometric transformations such as rotation, translation (horizontal or vertical shifts), cropping, scaling, and aspect ratio change.

We propose a new set of signatures based on local nonlinear filtering operations, such as multi-axis comparison filters. One set of embodiments for images and video calculates signatures based on mean subblock luminances. Signature recognition systems based on multi-axis filters show greater robustness to local changes introduced by operations such as logo and subtitle insertion, cropping and shifts. In addition, we show how these signatures can be adapted to deal with some amount of rotation.

One aspect of the invention is a method for image signal recognition comprising: receiving an electronic image signal; transforming the electronic image signal into signatures based on a multi-axis filtering of the electronic image signal; submitting the signatures to a database for matching to recognize the electronic image signal.

Another aspect of the invention is a method of constructing a content identification system. The method comprises receiving an electronic image signal; transforming the electronic image signal into signatures based on a multi-axis filtering of the electronic image signal; forming signature data structures from output of the filtering; storing the signature data structures in a database on one or more computer readable media; and transforming the signature data structures in the one or more computer readable media into a different structure.

Additional aspects of the invention include applying the multi-axis filtering to two dimensional representations of audio, such as a time-frequency representation. For example, one axis is frequency, and the other time. The non linear filter is applied to the neighboring samples of each of several samples in this time frequency domain in which each sample is a magnitude value in a frequency domain.

Further features will become apparent with reference to the following detailed description and accompanying drawings.

BRIEF DESCRIPTION OF THE DRAWINGS

FIG. 1A shows an image divided into 8×8 pixel subblocks. FIG. 1B shows the mean luminance of the subblocks. FIG. 1C shows the ordinal rank of the subblocks.

FIG. 6A shows that the relative values of the subblock mean luminances have changed.

DETAILED DESCRIPTION

The following description provides examples of non-linear multi-axis filters used to characterize content signals for identification, recognition, etc. This class of filters operates by comparing a sample with its neighbors to compute comparison values, combining the comparison values to compute a filtered value, and then replacing the sample with the filtered value. The comparison value can be a difference value between the sample and neighbor value or a quantized difference value (bi-level such as 1, −1 or multiple level quantization). The combination of the comparisons can be a sum or weighted sum, etc. of the comparison values. These filters operate on sample values of content signals in the spatial, time, spatio-temporal or transform domain (e.g., the compressed domain, frequency domain, or some other transform of the time, space or time-space values). As explained further, the filter output signal can be further quantized, sorted, organized into a vector or linked list data structure of filtered or sets of filtered/quantized values to optimize database searching, matching, correlation, or look up operations as part of content recognition processes.

Example embodiments of these types of filters are described in U.S. Pat. Nos. 7,076,082, 6,483,927, 6,724,914 and U.S. Patent Publication 20060031684, which are hereby incorporated by reference in their entirety. U.S. Pat. No. 7,076,082 describes an efficient look up table embodiment of a multi-axis filter, which can be implemented in machine instructions executed on a programmed processor, or special purpose electronic circuit. U.S. Pat. No. 6,724,914 describes use of a pre-filtering technique in a distributed processing environment, in which processing is performed across two or more computing devices, such as client server processors, and specifically, mobile/wireless handset devices and computer servers.

Figures 1A, 1B, 1C, 1D:
FIGS. 1A-C illustrate an example of a method for computing an image signature using ordinal ranking.
FIG. 1D shows alternative approach to computing a signature using an Octaxis signature of the mean luminance of subblocks.

In the case of image and video signals, local signatures can be obtained by applying filters to the mean subblock luminances themselves. This keeps the number of computations required for signature extraction low. A class of local nonlinear filters particularly useful for characterizing the underlying data is the multiaxis nonlinear comparison filters. These filters operate on local neighborhoods and compare the number of neighboring values above and below the candidate value. For example, consider a subblock towards the interior of the frame. This subblock has eight neighboring subblocks. The Octaxis nonlinear filter can be applied to the mean luminances of these subblocks. Octaxis compares the mean luminances of the candidate subblock and its eight neighbors. The filter output is given by the difference between the number of neighboring subblocks with mean luminances higher than the candidate subblock and the number of neighboring subblocks with mean luminances lower than the candidate subblocks. The output of the filter in this case is a value between −8 and +8. FIG. 1D shows the output of the Octaxis filter for the 8×8 subblocks of FIG. 1A. Note that Octaxis signatures can be derived from an arbitrary number of subblock arrangements (such as 2×2, 4×4 etc.).

The simplest approach to deriving binarized fingerprints from the Octaxis signatures is to treat each output value as a 5-bit quantity. This will result in a 320-bit fingerprint for the frame obtained from the 8×8 subblocks. However, more sophisticated schemes could be used to derive the fingerprints either to increase robustness or to decrease the number of computations required for searching and matching through a large database of fingerprints. One possible scheme is to collect a set of neighboring Octaxis values into a fingerprint. For example, four neighboring values (20 bits) could be collected into a basic fingerprint unit for comparison. Collection of neighboring signatures into fingerprint units improves robustness to local spatial changes in the video frame. A frame is then characterized by a collection of 20-bit values.

Another scheme is to quantize the Octaxis values to reduce the number of bits required for storage and comparison. This increases robustness and search speed at the cost of decreasing discriminative ability of the fingerprints. For example, the Octaxis values could be quantized into two bins—those with absolute values higher than a certain value (say 2) could be denoted as a 1, with the rest being denoted as 0. This yields 64 bits per frame. As before, collection of local bits (say 16 bits) could be stored. Quantization lends itself to coarse-to-fine search and matching strategies as well. In particular, the signatures for a particular piece of content are arranged in a database in a hierarchical arrangement of coarse (more highly quantized) to fine (lesser quantized) format. The database is sorted so that the unique signatures at each level of hierarchy form nodes in a tree structure. Each node points to the signatures in the next level of detail that share the same coarse signature of that node. Then, at the time of database look up, the coarse signature is used to index the node for that coarse signature, and matching proceeds down the tree at increasing levels of detail until a match or matches are found that satisfy desired match criteria.

Another way of improving robustness is to use redundant coding. In the preceding example, this could be achieved by storing overlapping sets of 16 neighbors as 16-bit signatures. Binary fingerprints allow search in a fingerprint database and matching with large numbers of fingerprints to be implemented as lookups (or tree traversals). Note that this technique can be applied to images as well. This approach can be implemented as a variant of the coarse to fine database organization and search technique in which sets of overlapping signatures are included in the database structure.

The class of local nonlinear filters described in this example considers only relative values of the subblock mean luminances within the local neighborhood. These filters are stable against global changes such as brightness and contrast changes as long as the subblock luminances maintain their relative values. The filters are also stable against changes introduced by operations such as compression. In addition, the filters also provide resilience against local changes. The filters are insensitive to local changes as long as relative values of the subblocks are maintained. Also, since the filters operate locally, large local changes introduce local changes in the filter output rather than global changes. The computational complexity of these filters is quite low, making them tractable for implementations in handheld devices and embedded systems.

The nonlinear filter described above can also be applied temporally by comparing the mean luminance of a subblock to the mean luminances of the subblock in the same spatial position in multiple preceding and succeeding frames. These signatures can be used to characterize the video signal over time.

The multi-axis spatial filter described above (Octaxis) can be extended to apply to frames immediately preceding or succeeding (or both). For example, considering the immediately previous and next frames, the mean luminance of each subblock (that is not at the periphery) can be compared to those of 26 other subblocks (8 in the same frame, and 9 each in the preceding and following frames). This results in spatiotemporal signatures for characterizing spatiotemporal aspects of the video.

Signatures based on local nonlinear filters show improved robustness to geometric transformations such as cropping and translation.

Figures 2A, 2B, 2C, 2D:
FIGS. 2A-D illustrate a similar example except that the image of FIG. 1A has been cropped.

FIG. 2A shows a horizontally cropped version of the frame shown in FIG. 1A. The subblock mean luminances around the horizontal borders of the frame are affected by the cropping as shown in FIG. 2B. Although the cropped out region is shown as black in this example, it could be replaced by an arbitrary background. The ordinal ranking of the subblock luminances for the cropped image are shown in FIG. 2C. The Octaxis signatures are shown in FIG. 2D.

Figures 3A, 3B, 4:
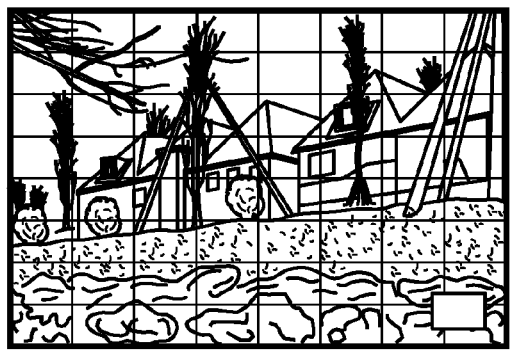
FIG. 3A shows the differences between the Ordinal signatures for the cropped and original frames.
FIG. 3B shows the differences between the Octaxis signatures for the cropped and original frames.
FIG. 4 shows a simulation of insertion of a logo in a video frame in the lower right corner of the frame.

FIG. 3A shows the differences between the Ordinal signatures for the cropped and original frames. Horizontal cropping (a local change to the frame) causes a global change in the Ordinal signatures as indicated by the fact that ordinal ranks for all subblocks have changed. The differences between Ordinal signatures shown in FIG. 2C and FIG. 1C illustrate in FIG. 3A that all ranks change for Ordinal signatures. FIG. 3B shows the differences between the Octaxis signatures for the cropped and original frames. For Octaxis signatures, the change due to horizontal cropping is localized to the horizontal borders, whereas the rest of the Octaxis values are unchanged.

Translation causes a shift in the image pixels in a frame. Differential luminance signatures are susceptible to translation. Ordinal signatures are similarly sensitive to translation. The Octaxis signatures, however, show some degree of resilience to translation. The Octaxis nonlinear filter is invariant to translation if the subblock boundaries remain intact (even if there is a positional shift within the frame). In addition, if fingerprints are derived from collection of Octaxis values (or quantized Octaxis values) of neighboring blocks, then the fingerprints will be resilient to translation. There will be a loss in robustness if the translational shift causes subblock boundaries to change. This can be mitigated by calculating signatures for multiple shifted configurations of subblocks, at the cost of increasing the computations for both signature extraction as well as matching with the database.

The effect of inserting a logo or inserting subtitles in the video sequence is similar to that of cropping. A certain part of the frame, not necessarily at the border, is cropped out and replaced with image content unrelated to that of the video frame. FIG. 4 shows a simulation of insertion of a logo in a video frame in the lower right corner of the frame.

Figures 5A, 5B, 6A, 6B:
FIG. 5A shows the differences between Ordinal signatures of the logo inserted image and the ordinal signatures of the original image.
FIG. 5B shows the differences between Octaxis signatures of the logo inserted image and the Octaxis signatures of the original image.
FIG. 6A shows the original image divided into 2×2 subblocks, with the mean luminance values of the subblocks superimposed.
FIG. 6B shows the corresponding nonlinear multiaxis filter values.

FIG. 5A shows the differences between Ordinal signatures of the logo inserted image and the ordinal signatures of the original image. The local change caused by logo insertion, causes a change in most of the ordinal ranks of the subblock mean luminances. FIG. 5B shows the differences between Octaxis signatures of the logo inserted image and the Octaxis signatures of the original image. Logo insertion causes only a small local change in the Octaxis signatures. Consequently, signatures obtained using the local nonlinear filters such as Octaxis are more robust against operations such as logo insertion and insertion of subtitles.

Although logo/subtitle insertion can also be dealt with by assuming that such insertions are more likely to occur towards the periphery of the frame. Under this assumption, areas of the frame towards the center can be weighted more heavily to reduce the contribution of the periphery. However, our approach based on the multiaxis filter is more general, allowing for logo/subtitle insertion at any location within the frame. In addition, it is computationally cheaper.

Block based fingerprinting schemes are sensitive to rotation. Usually rotation is accompanied by cropping the rotated regions that lie outside the specified boundary of the video frame. One approach to deal with rotation is to use larger subblocks. Kim and Vasudev observed that 2×2 subblocks can be effective at dealing with aspect ratio changes (such as converting a 4:3 video to letterbox format), since these transformations induce symmetrical changes in the subblocks. We propose using the 2×2 subblock configuration for dealing with rotation as well. FIG. 6A shows the original image divided into 2×2 subblocks, with the mean luminance values of the subblocks superimposed. FIG. 6B shows the corresponding nonlinear multiaxis filter values. As in the case of Octaxis, the filter output for each candidate subblock is the difference between the number of subblocks with mean luminance less than the candidate subblock and the number of subblocks with mean luminance greater than the candidate subblock. The output values are in the range −3 to +3 (since each subblock has 3 neighbors). Note that using larger sized subblocks reduce the discriminability of the signatures. As a result, these 2×2 signatures must be used in conjunction with temporal signatures (Kim and Vasudev), or in addition to the signatures derived from the smaller sized subblocks (e.g., 8×8) described earlier.

Figures 7A, 7B:
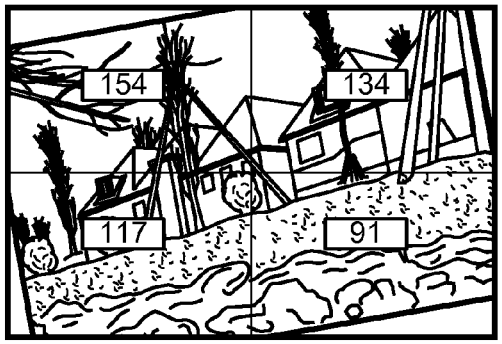
FIG. 7A shows the original frame rotated by 10 degrees.
FIG. 7B shows the multiaxis signatures computed from the 2×2 subblocks of the rotated image.

FIG. 7A shows the original frame rotated by 10 degrees. Notice that the subblock luminances change due to cropping. FIG. 7B shows the multiaxis signatures computed from the 2×2 subblocks of the rotated image. These signatures are identical to those in FIG. 6B, illustrating that signatures based on 2×2 subblocks are indeed resilient to at least some amount of rotation.

Figures 8A, 8B:
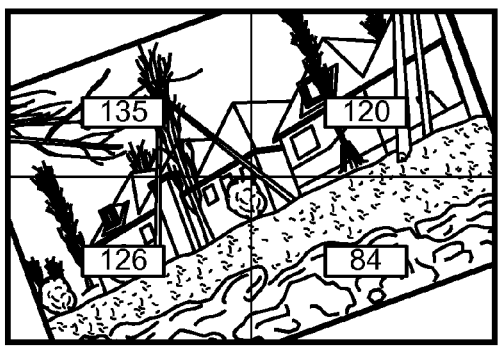
FIG. 8A shows the video frame rotated by 20 degrees and cropped. Comparison of FIG. 8A with FIG. 7A
FIG. 8B shows the corresponding multiaxis signature from mean luminances of the 2×2 subblocks in FIG. 8A.

Larger amounts of rotation still pose a problem, though. FIG. 8A shows the video frame rotated by 20 degrees and cropped. Comparison of FIG. 8A with FIG. 7A and FIG. 6A shows that the relative values of the subblock mean luminances have changed. As a result, the multiaxis signatures derived from the 20 degree rotated image are different than those derived from the original image (compare with FIG. 6B).

Figure 9:
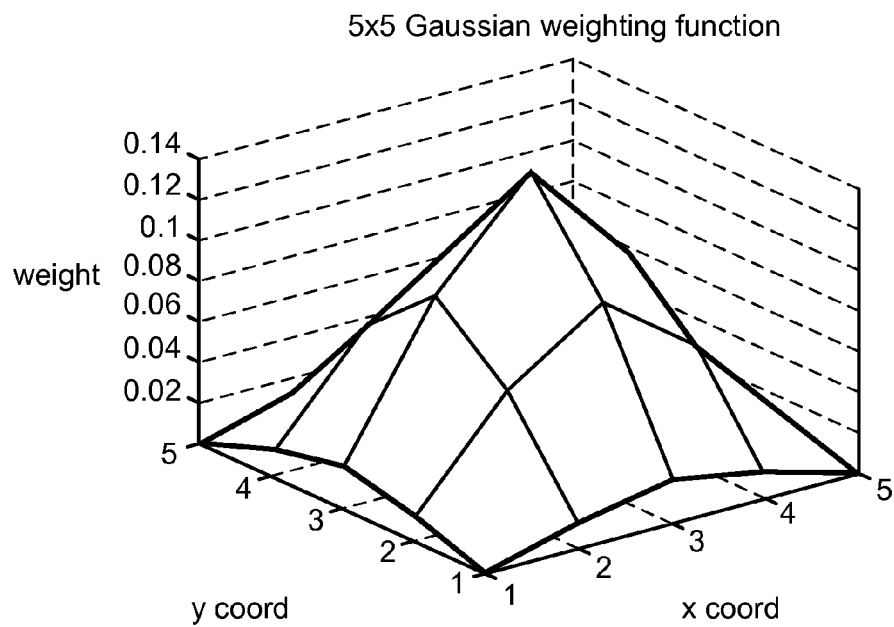
FIG. 9 shows a Guassian weighting function used in an example implementation.
Figure 10:
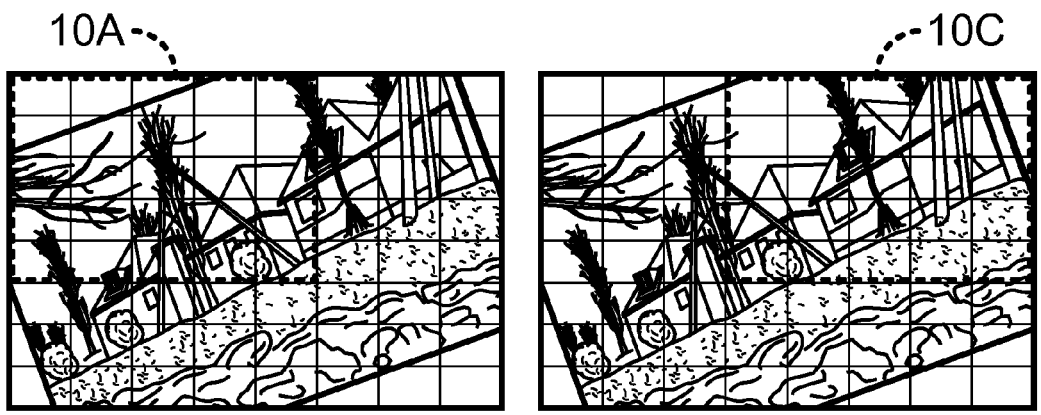
FIG. 10 shows 5×5 groupings of 8×8 subblocks to which the Guassian function is applied to obtain the weighted 2×2 subblock mean luminances as shown in FIG. 11A.
Figure 10A:
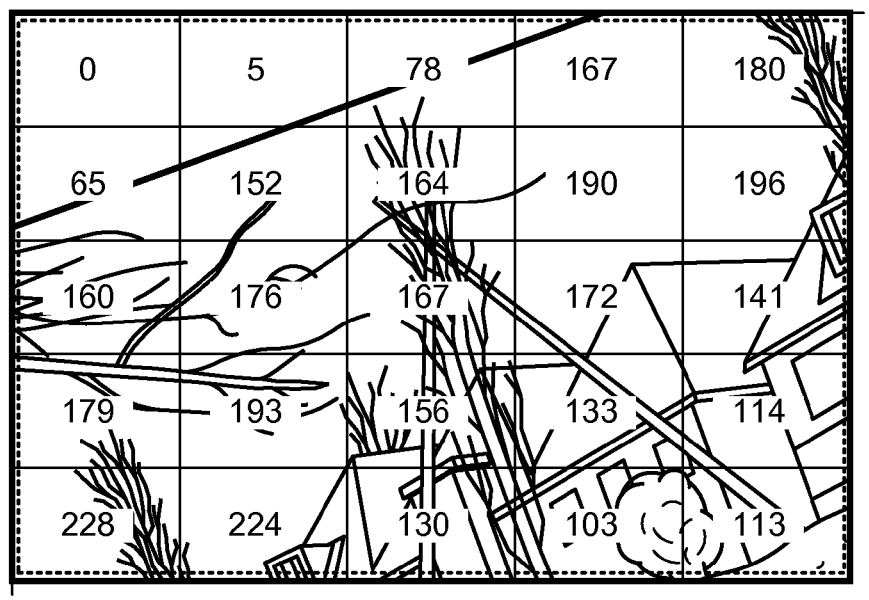
Figure 10B:
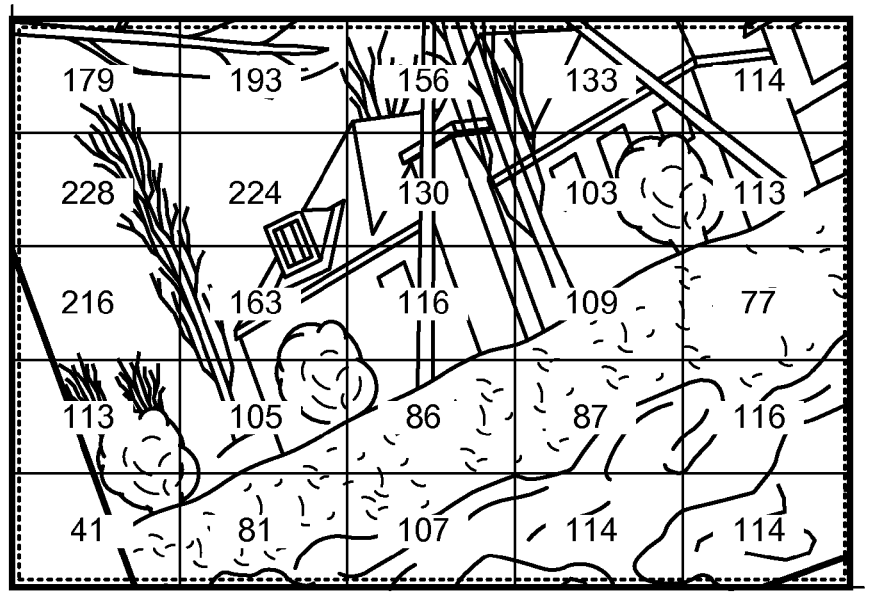
Figure 10C:
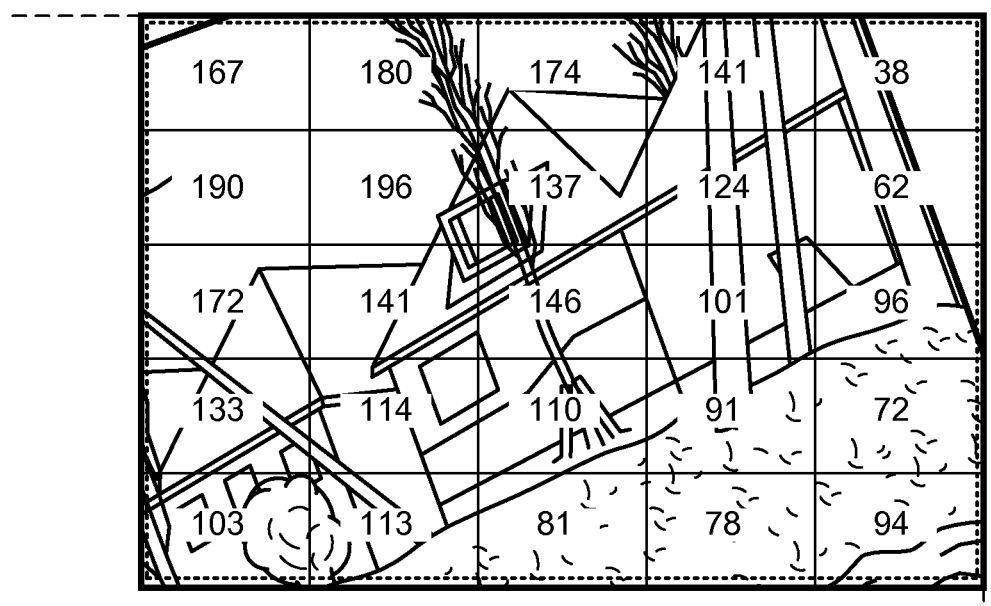
Figure 10D:
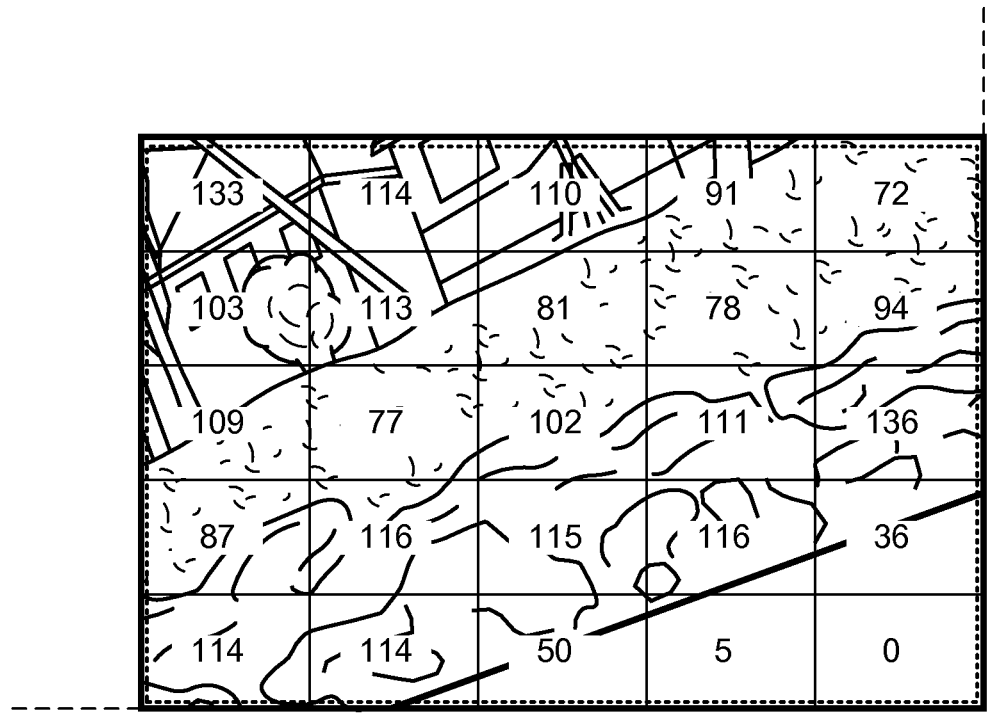
Figures 11A, 11B:
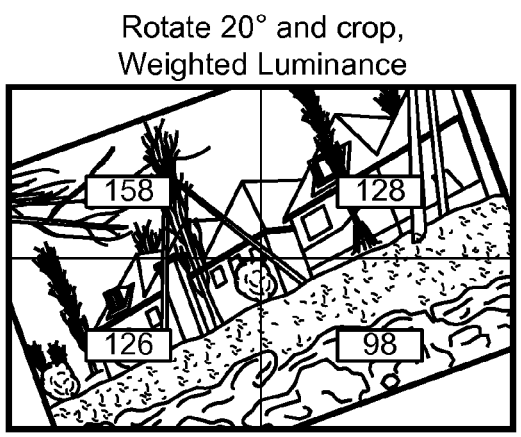
FIG. 11A shows the 2×2 weighted blocks obtained from applying the Guassian function of FIG. 9 to the 5×5 subblock groupings in FIG. 10.
FIG. 11B shows the multiaxis signatures derived from the weighted subblock mean luminances.

We have developed an approach to extract signatures that are more robust under larger rotations. From FIG. 7A and FIG. 8A, note that the regions of the image that are most stable under rotation are the parts closer to the center of the frame and closer to the diagonals. To reduce sensitivity to rotation, we use a weighting function that emphasizes these regions and deemphasizes other regions. To reduce the computational burden of applying the weighting function to the entire frame, we apply the weighting to the mean luminances of the 8×8 subblocks. One example of such a weighting function is the 5×5 Gaussian function shown in FIG. 9. This Gaussian function is multiplied with the mean luminances of 8×8 subblocks as shown in FIG. 10 to obtain the weighted 2×2 subblock mean luminances as shown in FIG. 11A. FIG. 11B shows the multiaxis signatures derived from the weighted subblock mean luminances. Comparing with the signatures of the original image in FIG. 6B, one can verify that the signatures are identical even for the case of 20 degree rotation.

We have described a new technique for characterizing video using local nonlinear filters. These filters can be used to obtain signatures from the video that can be used for fingerprinting. The filters provide stability against both global and local changes to the video, including geometric changes such as cropping, rotation and shift. In addition, the signatures resulting from these filters are able to resist manipulations such as logo and subtitle insertion. The fingerprints derived from the signatures can be made even more robust by quantization. Binary fingerprints can be easily derived from the signatures, allowing search in the fingerprint database and matching to a large number of fingerprints to be implemented as look-ups or tree searches. The computational complexity of these filters is low, making them well suited for practical applications of fingerprinting including implementation of fingerprint extraction on mobile devices and embedded systems.

Figure 12:
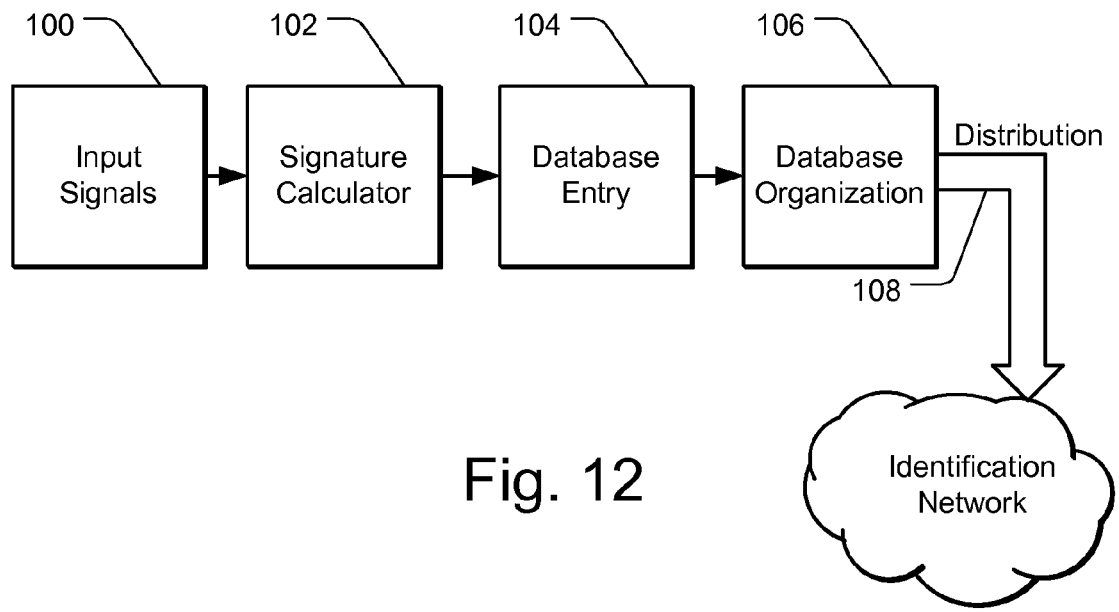
FIG. 12 is a block diagram illustrating the creation of a content recognition system using signatures.

FIG. 12 is a block diagram illustrating the creation of a content recognition system using signatures. The digitized input image/video signals 100 are input to the signature calculator 102, which computes multiple signatures for each content item to be uniquely recognized. In a database entry process 102, the signatures are entered and stored in a database. A database organization process 106 in a database system sorts and arrange the signatures in a data structure, such as a tree structure as describe previously, to enable fast searching and matching. This database itself is distributed over an array of computers in an identification network (108). This network receives queries to identify or recognize content items based on a stream of signatures from a requesting device, such as a user's handheld mobile device or other computing device.

Figure 13:
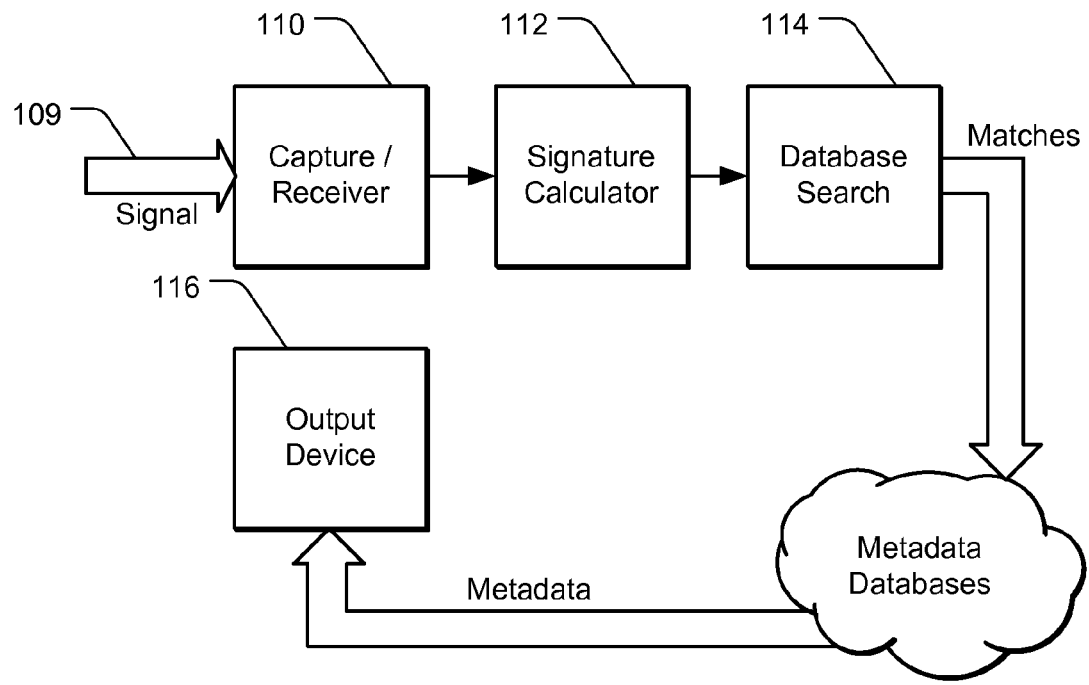
FIG. 13 is a block diagram illustrating a content recognition process using the content recognition system.

FIG. 13 is a block diagram illustrating the content recognition process. Incoming signals 109 are captured in a receiver 110. This includes still or video image capture in which images are captured and digitized with an image sensor like a camera or other image capture device. It also includes receipt of image of video content in a broadcast or transmission channel, including broadcast stream or file transfer. The recognition process may be invoked as part of a systematic Internet monitoring or broadcast monitoring of content signals, in home audience measurement, batch database searching and content indexing, or user requests for content recognition and metadata searching. The signature calculator 112 computes signatures for incoming content items and issues them to a database for database search 114. The matches found in the search process provide content identification (a number or some other form of index for metadata lookup), which in turn, enables look up of metadata corresponding to the content identification in one or more metadata databases. The metadata is then returned to device 116 for display. This may involve returning metadata to a device that requesting the database search or some other device to which the search results are directed (e.g., a user's home device, or a monitoring system's data collection database in which the metadata and recognition events are aggregated and compiled for electronic report generation).

Figure 14:
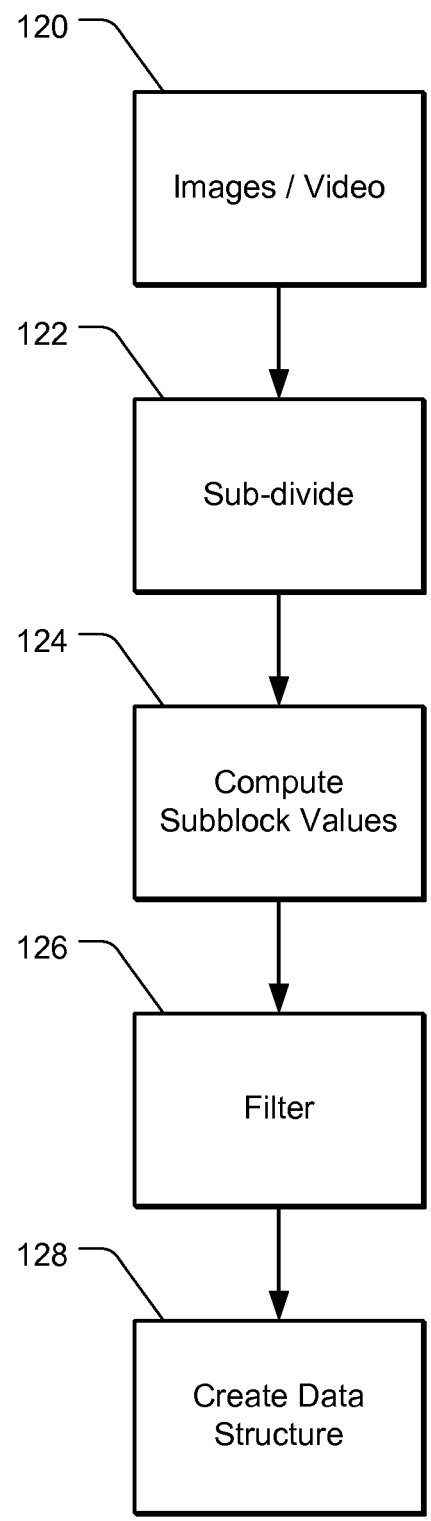
FIG. 14 is a flow diagram illustrating a process for database entry that may be used in the content recognition system of FIG. 12.

FIG. 14 is a flow diagram illustrating a process for database entry corresponding to FIG. 12. The image or sequence of images (for video) are captured, and digitized (if not already in that form)(120). The images are sub-divided into sub-blocks 122. As noted above, the sub-division may be made using fixed block sizes or adapted block sizes (e.g., blocks that adapt to the size and aspect ratio of images/video frames). Further sub-division may be adapted to feature points in the content signal (e.g., relative to edges, object boundaries, local maxima/minima in color or luminance, etc.) Some signal formats already have inherent sub-block division such as compressed video and images, which the image is sub-divided into sub-blocks of quantized transform domain coefficients (DCT, wavelet, etc.) In this case, the signature can be applied to the partially decompressed coefficient values.

Next the sub-block values are calculated (e.g., the mean luminance value, or mean color values, or derivatives or domain transforms thereof)(124). While the example of mean luminance value is used above, other sample attributes may be used in the alternative, such as color, contrast, etc. Next, the multi-axis filter is applied to compute filtered values (126). These filtered values are organized into signature data structures (128). This process includes forming hashes from the filtered values, and quantizing the signatures into levels of detail as noted above. It may also include creating overlapping signatures and/or signatures of shifted/transformed versions of the image to improve robustness to these types of shifts/transforms. The resulting data structures of the signatures are stored in a database where they are further organized to optimize searching. In particular, the signatures are sorted, organized into a linked data structure, such as a tree structure. Fast searching is conducted by using a quantized signature to index into the database and retrieve candidate signatures for further matching as explained above.

Figure 15:
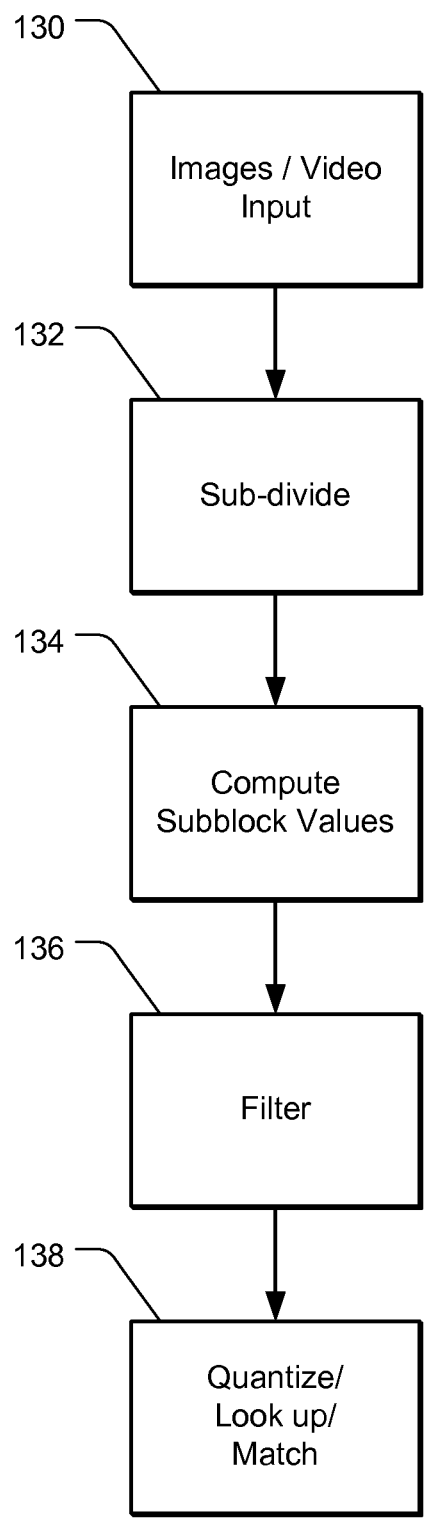
FIG. 15 is a flow diagram illustrating the content recognition process for an incoming signal.

FIG. 15 is a flow diagram illustrating the content recognition process for an incoming signal. Blocks 130-138 are similar to 120-128 in FIG. 14. However, the incoming content items are usually distorted versions of the originals due to manipulation that occurs during distribution and use. The content signals are captured/sampled in receiving devices, and often, only portions of the content item are available for recognition (e.g., a cropped image, or a scaled/cropped video segment from a video program in the database). The use of feature point detection can assist in re-creating similar sub-division into blocks. For example, two or more pairs of feature points can be detected and used to normalize the coordinate space of the content signal with respect rotation and/or scaling prior to sub-dividing it into blocks.

The above recognition process can be adapted to electronic audio signals by transforming a sampled audio signal into a time-frequency representation and applying the multi-axis filtering to the neighboring values in this representation. For background on such a representation of audio, see U.S. Pat. No. 6,674,876, which is hereby incorporated by reference. The electronic audio signal is captured and time segments of the audio signal are converted into a frequency domain (e.g., using a Fast Fourier Transform) to provide a set of values (Fourier magnitude) for each time segment corresponding to a discrete time. Each set of values from a frequency transform of a time segment of audio forms values along the frequency axis, and the adjacent sets of values for previous and subsequent time segments of audio form the time axis. The multi-axis filtering is applied along these two axes in the two dimensional representations of audio. Specifically, the non linear filter is applied to the neighboring samples of each of several samples in this time frequency domain in which each sample is a magnitude value in a frequency domain. Each sample in the time frequency representation can be pre-filtered from a block of neighboring samples prior to applying the signature extraction using a multi-axis filter. The multi-axis filter provides the signature analogous to the approaches described above.

It is envisioned that the above processes, systems and system components can be implemented in a variety of computing environments and devices. It is specifically contemplated that the processes and components will be implemented within devices and across multiple devices. For example, signal capture, signature calculation and database entry and organization are performed on a set of devices to construct a recognition system, and signal capture, signature calculation and database search and retrieval are performed on another set of devices, which may be distinct or overlap.

The computing environments used to implement the processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices include, as necessary, one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals includes transforming of these signals in various physical forms. Images and video (forms of electromagnetic waves traveling through physical space and depicting physical objects) may be captured from physical objects using cameras or other capture equipment, or generated by a computing device. Similarly, audio pressure waves traveling through a physical medium may be captured using an audio transducer (e.g., microphone) and converted to an electronic signal (digital or analog form). While these signals are typically processed in electronic and digital form to implement the components and processes described above, they may also be captured, processed, transferred and stored in other physical forms, including electronic, optical, magnetic and electromagnetic wave forms. The content signals are transformed during processing to compute signatures, including various data structure representations of the signatures as explained above. In turn, the data structure signals in memory are transformed for manipulation during searching, sorting, reading, writing and retrieval. The signals are also transformed for capture, transfer, storage, and output via display or audio transducer (e.g., speakers).

While reference has been made to mobile devices (like cell phones) and embedded systems, it will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in published patent application 20080174570.)

Figure 16:
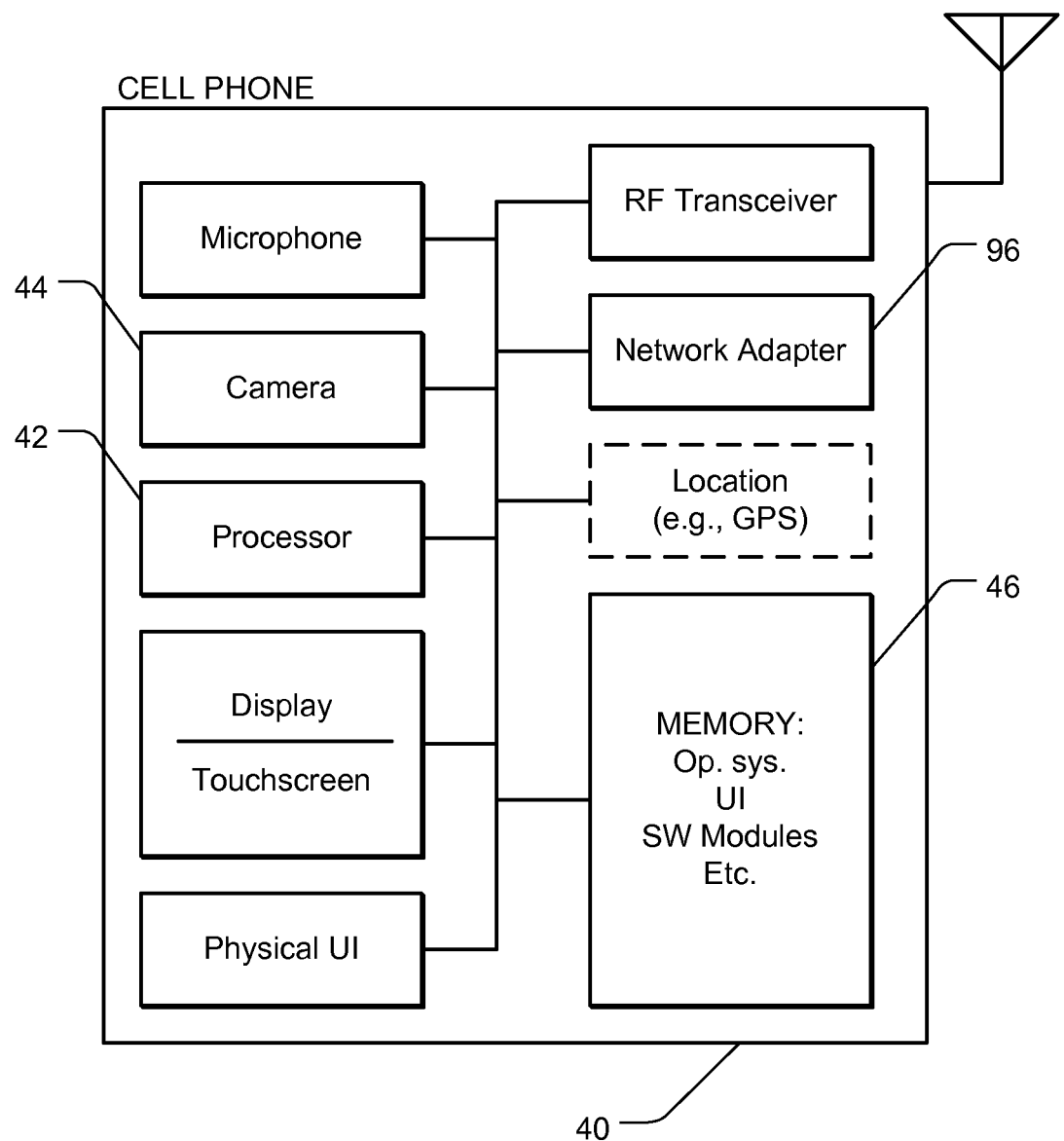
FIG. 16 illustrates a cell phone device in which components of the content recognition process may be implemented.

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). An exemplary cell phone that can be used to practice part or all of the detailed arrangements is shown in FIG. 16.

The processor can be a special purpose hardware device, or may be implemented by a programmable device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more digital signal processing cores, such as Texas Instruments TMS320 series devices.

Software instructions for implementing the detailed functionality can be readily authored by artisans, from the descriptions provided herein. References, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, extraction of signatures from a test image on a cell phone, and searching of a database for corresponding reference images on a remote server, is one architecture, but there are many others. For example, information about reference images may be stored on the cell phone—allowing the cell phone to capture a test image, generate signatures, and compare against stored signature data structures for reference images—all without reliance on externals devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

I claim:

1. A method for image signal recognition comprising:
   receiving an electronic image signal;
   transforming the electronic image signal into signatures based on a multi-axis filtering of the electronic image signal, the multi-axis filtering comprising comparing a first image signal value obtained from the electronic image signal at a first location with values obtained from locations situated along plural axes passing through the first location to provide plural comparisons corresponding to the plural axes, computing a function of the plural comparisons as filter output for the first location, repeating the multi-axis filtering for locations across the electronic image signal to provide signatures for corresponding portions of the electronic image signal;
   submitting the signatures to a database for matching to recognize the electronic image signal.

2. The method of claim 1, wherein acts of claim 1 are performed on one or more programmed processors.

3. The method of claim 1 wherein the signatures are based on a multi-axis comparison filter operate on mean luminance values of block of the electronic image signal.

4. The method of claim 1 wherein the electronic image signal comprises a video signal.

5. The method of claim 1 wherein the signatures are based on a multi-axis filtering of attributes of the electronic image signal, and the signature is also derived from a feature other than the attributes.

6. The method of claim 5 wherein the feature provides location information used as a reference for determining the attributes.

7. The method of claim 1 comprising:
   computing at least a portion of the signature by quantizing output of the multi-axis filtering.

8. The method of claim 1 wherein the first location and the locations situated along the plural axes correspond to sub-blocks, and the values obtained from the locations comprise values computed from corresponding sub-blocks.

9. The method of claim 1 wherein the plural axes are in spatial directions relative to the first location.

10. The method of claim 9 wherein the plural axes include a temporal direction.

11. The method of claim 1 wherein the plural axes include a temporal direction.

12. A non-transitory computer readable medium on which is stored instructions, which, when executed by a processor, perform a method for image signal recognition comprising:
    receiving an electronic image signal;
    transforming the electronic image signal into signatures based on a multi-axis filtering of the electronic image signal, the multi-axis filtering comprising comparing a first image signal value obtained from the electronic image signal at a first location with values obtained from locations situated along plural axes passing through the first location to provide plural comparisons corresponding to the plural axes, computing a function of the plural comparisons as filter output for the first location, repeating the multi-axis filtering for locations across the electronic image signal to provide signatures for corresponding portions of the electronic image signal;
    submitting the signatures to a database for matching to recognize the electronic image signal.

13. A system for audio or visual signal recognition comprising:
    a memory for receiving an electronic signal representing audio or visual content;
    a processor in communication with the memory for transforming the electronic signal into signatures based on a multi-axis filtering of the electronic signal, the multi-axis filtering comprising comparing a first signal value obtained from the electronic signal at a first location with values obtained from locations situated along plural axes passing through the first location to provide plural comparisons corresponding to the plural axes, computing a function of the plural comparisons as filter output for the first location, repeating the multi-axis filtering for locations across the electronic signal to provide signatures for corresponding portions of the electronic signal; and for submitting the signatures to a database for matching to recognize the electronic signal.

14. The system of claim 13 wherein the signatures are based on a multi-axis comparison filter operate on mean luminance values of block of an electronic image signal.

15. The system of claim 13 wherein the electronic signal comprises an electronic video signal.

16. The system of claim 13 wherein the signatures are based on a multi-axis filtering of attributes of the electronic signal, and the signature is also derived from a feature other than the attributes.

17. The system of claim 16 wherein the feature provides location information used as a reference for determining the attributes.

18. The system of claim 13 comprising:
    a processor for computing at least a portion of the signature by quantizing output of the multi-axis filtering.

19. The system of claim 13 comprising:
    a processor for transforming an electronic audio signal into a time-frequency representation, wherein multiple axes of the multiple axis filtering comprise a time axis and a frequency axis of the time-frequency representation.

20. The system of claim 13 wherein the first location and the locations situated along the plural axes correspond to sub-blocks, and the values obtained from the locations comprise values computed from corresponding sub-blocks, and wherein the plural axes are in spatial or temporal directions relative to the first location.

21. A method of constructing a content identification system, the method comprising:

receiving an electronic image signal;

transforming the electronic image signal into signatures based on a multi-axis filtering of the electronic image signal, the multi-axis filtering comprising comparing a first image signal value obtained from the electronic image signal at a first location with values obtained from locations situated along plural axes passing through the first location to provide plural comparisons corresponding to the plural axes, computing a function of the plural comparisons as filter output for the first location, repeating the multi-axis filtering for locations across the electronic image signal to provide signatures for corresponding portions of the electronic image signal;

forming signature data structures from output of the filtering;

storing the signature data structures in a database on one or more computer readable media; and transforming the signature data structures in the one or more computer readable media into a different structure.

22. The method of claim 21 wherein the transforming comprising sorting the signatures into an indexed data structure.

23. The method of claim 22 wherein the indexed data structure is indexed by at least a part of the signature data structures.

24. The method of claim 23 wherein the indexed data structure is indexed by a quantized part of the signatures.

25. A non-transitory computer readable medium on which is stored instructions, which, when executed by a processor, perform a method of constructing a content identification system, the method comprising:

receiving an electronic image signal;

transforming the electronic image signal into signatures based on a multi-axis filtering of the electronic image signal, the multi-axis filtering comprising comparing a first image signal value obtained from the electronic image signal at a first location with values obtained from locations situated along plural axes passing through the first location to provide plural comparisons corresponding to the plural axes, computing a function of the plural comparisons as filter output for the first location, repeating the multi-axis filtering for locations across the electronic image signal to provide signatures for corresponding portions of the electronic image signal;

forming signature data structures from output of the filtering;

storing the signature data structures in a database on one or more computer readable media; and transforming the signature data structures in the one or more computer readable media into a different structure.

* * * * *